United States Patent
Larson et al.

(10) Patent No.: US 9,211,032 B2
(45) Date of Patent: Dec. 15, 2015

(54) METHOD AND A SYSTEM FOR PRODUCING FOAMED MILK

(75) Inventors: Peter Larson, Arvika (SE); Patrik Olsson Stridsberg, Amotfors (SE)

(73) Assignee: CREM INTERNATIONAL AKTIEBOLAG, Amotfors (SE)

( * ) Notice: Subject to any disclaimer, the term of this patent is extended or adjusted under 35 U.S.C. 154(b) by 478 days.

(21) Appl. No.: 13/578,265

(22) PCT Filed: Jun. 15, 2010

(86) PCT No.: PCT/SE2010/050670
§ 371 (c)(1),
(2), (4) Date: Oct. 10, 2012

(87) PCT Pub. No.: WO2011/105943
PCT Pub. Date: Sep. 1, 2011

(65) Prior Publication Data
US 2013/0209639 A1    Aug. 15, 2013

(30) Foreign Application Priority Data
Feb. 26, 2010   (WO) ................. PCT/SE2010/050228

(51) Int. Cl.
*A23C 7/00* (2006.01)
*A47J 31/41* (2006.01)
*A47J 31/44* (2006.01)

(52) U.S. Cl.
CPC ............... *A47J 31/4496* (2013.01); *A23C 7/00* (2013.01); *A47J 31/4485* (2013.01); *A47J 31/41* (2013.01)

(58) Field of Classification Search
None
See application file for complete search history.

(56) References Cited

U.S. PATENT DOCUMENTS

| | | | |
|---|---|---|---|
| 4,676,401 A | 6/1987 | Fox | |
| 6,024,252 A | 2/2000 | Clyde | |
| 6,095,676 A | 8/2000 | Kuan | |
| 6,283,625 B2 | 9/2001 | Frankel | |
| 6,698,625 B2 | 3/2004 | Ufheil | |
| 7,248,062 B1 | 7/2007 | Samsavar | |
| 7,258,062 B2 | 8/2007 | Green | |
| 7,475,628 B2 * | 1/2009 | Lussi | 99/286 |
| 7,527,818 B2 * | 5/2009 | Dirren | 426/474 |

(Continued)

FOREIGN PATENT DOCUMENTS

| | | |
|---|---|---|
| DE | 102007042076.7 | 3/2009 |
| EP | 1312292 | 10/2002 |

(Continued)

OTHER PUBLICATIONS

Letter from Bravilor Bonamat B.V., Postbus 188. 1700 AD Heerhugowaard, The Netherlands, Jun. 23, 2015, pp. 1-3.

(Continued)

*Primary Examiner* — Michele L Jacobson
*Assistant Examiner* — Amber Cox
(74) *Attorney, Agent, or Firm* — Jeffrey S. Melcher; Manelli Selter PLLC (57) ABSTRACT

The invention relates to a method for producing foamed milk. The method comprises passing milk from a bag-in-box container 1 through a conduit 3 by means of a pump 4 and heating the milk by passing it through a continuous-flow heater 5. At the end of the conduit 3, the milk is whipped to foam by an impeller in a mixer bowl. The invention also relates to a system for producing foamed milk. The system comprises a conduit 3, a heater 5, a pump 4 and a mixer bowl 7 with an impeller 8.

16 Claims, 6 Drawing Sheets

(56) References Cited

U.S. PATENT DOCUMENTS

| | | | |
|---|---|---|---|
| 7,913,614 B2 * | 3/2011 | Fukushima et al. | 99/323.1 |
| 8,181,825 B2 * | 5/2012 | Reddy et al. | 222/148 |
| 2003/0089244 A1 | 5/2003 | Imboden | |
| 2004/0118291 A1 | 6/2004 | Carhuff | |
| 2004/0118871 A1 | 6/2004 | Coronado | |
| 2007/0068966 A1 | 3/2007 | Orzech | |
| 2008/0020115 A1 | 1/2008 | Guerrero | |
| 2009/0087532 A1 * | 4/2009 | Meier | 426/474 |

FOREIGN PATENT DOCUMENTS

| | | | | |
|---|---|---|---|---|
| EP | 1815774 A1 * | 8/2007 | | A47J 31/52 |
| EP | 2538825 | 1/2011 | | |
| WO | 2006/093406 | 9/2006 | | |
| WO | 2009138313 | 11/2009 | | |
| WO | 2009150616 | 12/2009 | | |
| WO | 2010002653 | 3/2010 | | |
| WO | 2010026053 | 3/2010 | | |
| WO | 2011/049580 | 4/2011 | | |

OTHER PUBLICATIONS

International Search Report mailed Feb. 23, 2011 in parent PCT application.
Written Opinion mailed Feb. 16, 2011 in parent PCT application.
Communication of Notice of Opposition, issued in European Patent Application No. 10846736.6, Sep. 9, 2015, pp. 1-26.

* cited by examiner

METHOD AND A SYSTEM FOR PRODUCING FOAMED MILK

CROSS REFERENCE TO RELATED APPLICATIONS

This application is a national stage entry under 35 U.S.C. 371 of International Application No. PCT/SE2010/050670, filed 15 Jun. 2010, designating the United States. This application also claims priority under 35 U.S.C. 119, 120 and 365 to PCT/SE2010/050228, filed 26 Feb. 2010. The complete contents of these Applications are incorporated herein by reference.

FIELD OF THE INVENTION

The present invention relates to a method and a system for producing foamed milk, in particular for hot beverages such as coffee or chocolate.

BACKGROUND OF THE INVENTION

Hot beverages such as cappuccino are becoming increasingly popular. Such beverages are often given a topping of foamed milk. When hot beverages are sold by commercial businesses such as fast food restaurants, such a topping may often be made from powder products. However, many customers prefer a topping made from real milk. Therefore, there is a need for devices that can use real milk and transform the milk to milk foam and such devices are also used worldwide. A solution which has been used in many such devices is to add hot steam to the milk in order to transform the milk to foam. U.S. Pat. No. 7,258,062 discloses a system and a method for producing foamed and steamed milk by means of pressurized air and steam. Pressurized air is added to pressurized milk and steam is supplied from a steam generator. The steam may be pressurized. From a mixing area, a mixture of milk, air and steam is passed through an expansion area where expansion may cause the milk, air and steam mixture to foam as pressure is reduced. In such a system, it is difficult to control the temperature of the milk. Moreover, the function is dependent on the supply of steam. A different method is disclosed in U.S. Pat. No. 7,527,818. The method disclosed in that patent includes suctioning milk from a container into a suction line by means of a pump. The milk is conveyed through a continuous-flow heater which is disposed in the suction line. Air is added to the milk before the milk passes through the continuous flow heater such that the milk that passes through the heater is mixed with air. Downstream of the pump, a there is a throttle point with an adjustable throttle valve. The pressure can be adjusted by means of the throttle valve. It is stated that the temperature of the heater element is controllable for the purpose of adjusting the temperature of the milk/air mixture at the outlet of the continuous-flow heater.

It is a purpose of the present invention to provide an improved method and an improved system for producing foamed milk for hot beverages such as coffee or chocolate. One purpose of the invention is to provide an effective way of transforming the milk into foam. Another purpose is to provide an effective and reliable way of heating the milk. Yet another purpose is to provide an effective way of cleaning the system after a quantity of milk has been passed through the system.

SUMMARY OF THE INVENTION

The invention comprises passing milk from a milk container through a milk conduit by means of a pump. The pump is arranged to convey liquid through the milk conduit. The milk is heated in a heating step where the milk is passed through or past a continuous-flow heater. The milk conduit is preferably arranged to pass through the continuous-flow heater but could also be arranged in some other way in relation to the heater as long as the heater is capable of heating milk in the conduit as the milk passes the conduit. The pump may be located downstream of the continuous-flow heater but is preferably located upstream of the continuous-flow heater. The heated milk is conveyed through the milk conduit, from the milk container and past the heater and the pump to an outlet. According to the invention, the heated milk is whipped by means of a rotating element before the milk leaves the outlet. Thereby, the heated milk is whipped by means of a rotating element such that the heated milk is transformed to foam.

The inventive method may also comprise replacing an empty milk container with a new milk container. The pump may be a peristaltic pump and the new milk container may have an outlet tube of a flexible material which outlet tube is initially sealed at its end. The method may then comprise placing a portion of the outlet tube in the peristaltic pump while the outlet tube is still sealed at its end such that the pump squeezes the outlet tube together and blocks the passage of fluid through the outlet tube when the pump is not activated. The outlet tube is then opened downstream of the pump and connected to the milk conduit such that milk may pass from the milk container and into the milk conduit.

According to an embodiment of the invention, the temperature of the milk is detected by a temperature sensor after the milk has been passed through the continuous-flow heater. A signal from the temperature sensor may then be generated which signal is based on the detected temperature. The signal is then used to control the speed of the pump order to reach or maintain a set value for the temperature of the milk.

Preferably, the temperature of the milk is detected by a sensor also before the milk is passed through or past the continuous flow heater. The speed of the pump may then be controlled on the basis of both the temperature of the milk before the continuous flow heater and the temperature of the milk after the continuous flow heater.

Alternatively, the temperature of the continuous flow heater may be monitored and based on a detected temperature of a part of the continuous flow heater itself, the speed of the pump may be controlled.

In embodiments of the invention, a hot cleaning liquid such as water may be caused to flow through the conduit after a predetermined quantity of milk has passed through the conduit and out through the outlet such that the conduit is cleaned thereby. Preferably, such a cleaning may comprise interrupting the flow of hot cleaning liquid and operating the pump to pump air through the milk conduit such that remnants of liquid are removed from the conduit.

Although the milk is preferably transformed into foam by means of a rotating element such as an impeller, the inventive method of heating the milk may be used also in such applications where some other way of transforming the hot milk into foam is used.

DETAILED DESCRIPTION OF THE INVENTION

A first embodiment of the invention will now be described with reference to FIG. 1. A container 1 for milk is showed as being placed inside a box 2 which may advantageously be a refrigerator in which the milk container is placed to keep the milk at a low temperature such that the storage life of the milk is increased. While the use of a refrigerator may increase the storage life of the milk, it should be understood that the refrigerator is optional. Suitably, the temperature of the milk may be held at a temperature of about 10° C. This can be achieved by means of a peltier element. The milk container 1 may be a bag-in-box container. In many realistic embodiments, such a bag-in-box container may have a capacity of 4-10 liters. For example, it may have a capacity of 5 liters. The milk may optionally have been treated to further increase the storage life of the milk. For example, the milk may have been sterilized by a process known as "Ultra High Temperature Processing" or "Ultra High Treatment", both abbreviated UHT. The UHT process is a process in which milk is sterilized by heating it for a short period, for example 1-2 seconds, at a high temperature, suitably a temperature above 135° C. to kill spores in the milk. Such milk may be referred to as UHT milk and may have a shelf life of six to nine months, until opened. If the UHT milk in the container 1 can be protected from exposure to air, the need for a refrigerator 2 is reduced or eliminated. The container 1 can preserve the milk for a longer period without being placed in a refrigerator.

Figure 7:
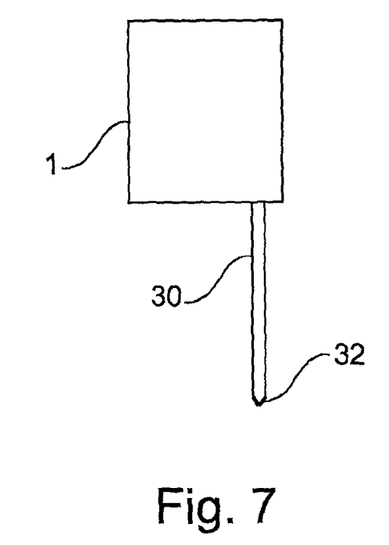
FIG. 7 is a schematic representation of a milk container.

A conduit 3 is connected to the milk container 1. The milk container 1 may have a short outlet tube 30 (see FIG. 7) of a preferably flexible material. When the container 1 has a short outlet tube 30, this outlet tube may be connected directly or indirectly to the milk conduit 3. The conduit 3 may comprise a flexible tube, for example, a silicone tube with an internal diameter of, for example, 4 mm-8 mm. Of course, other materials and dimensions are also conceivable. It is also possible that the conduit comprises several components (e.g. tube parts), perhaps of different materials, that have been combined to form a conduit. It should be understood that the milk container 1 may sometimes need to be replaced. The conduit 3 may then be disconnected from an old milk container and connected to a new milk container. This may be the case when, for example, the old milk container has become empty, or if it needs to be replaced for some other reason. A pump 4 is arranged to or operable to convey a liquid, for example milk, through the milk conduit 3. The pump may be connected directly to the conduit 3 or arranged to be able to act on a conduit leading to the milk conduit 3. For example, the pump 4 may be arranged on a supporting structure that also carries the continuous flow heater 5 but at a location upstream of the continuous flow heater 5 such that it can be connected to a conduit that leads to the continuous flow heater. Suitably, the pump 4 may be arranged at a distance less than 40 cm from the continuous flow heater 5, for example a distance of 2 cm-20 cm or 3 cm-15 cm. Optionally, a pump 4 or other means for conveying milk through the milk conduit 3 could even be located inside the container 1. The system also comprises a continuous-flow heater 5 that the conduit 3 passes. The continuous-flow heater 5 is arranged to heat (or to be capable of heating) milk in the conduit 3 as the milk passes the continuous-flow heater 5. Preferably, the conduit 3 passes through the continuous-flow heater although it could conceivably also pass over a surface of the heater or even at a distance from the heater. In FIG. 1, the continuous-flow heater 5 is shown as being placed upstream of the pump 4. For the purposes of this application, the term "continuous-flow heater" should be understood as a heater through which a liquid may flow as it is heated. In many realistic embodiments of the invention, the continuous-flow heater may be dimensioned for an output of about 2.0 kW-3.0 kW and the inventors have contemplated one version where the heater 5 is dimensioned for an output of 2.4 kW and another version where the heater 5 is dimensioned for an output of 2.2 kW. It should be understood that the continuous-flow heater may be any kind of heater that is capable of transferring heat to the milk as the milk passes the heater. The heating may be achieved by means of any known method for heating liquid in a conduit.

The pump 4 may advantageously be a peristaltic pump. The use of a peristaltic pump entails the advantage that the components of the pump do not get into direct contact with the milk. In this context, it is an advantage of the conduit comprises a flexible tube, at least where the conduit passes the pump. Preferably, the tube is then of an elastic material.

The system comprises means for transforming heated milk into foam. At an end of the conduit 3, there is an outlet 6 through which outlet 6 foamed milk may leave the system. As can be seen in FIG. 1, the system further comprises a mixer bowl 7 through which the milk must pass before it reaches the outlet 6. In the mixer bowl 7, a rotatable element 8 is arranged to be able to whip heated milk into foam. The mixer bowl 7 may take many different forms. For example, a suitable mixer bowl may be obtained from Componenti Vending S.p.A Via Volta 28—Rosate (MI), Italy. Componenti Vending S.p.A. markets such a mixer bowl under the name "mixing system series 243". The rotating element 8 may suitably be an impeller which can be driven by for example a motor 19. The motor 19 may be an electric AC or DC motor. For the purposes of this application, the mixer bowl 7 can be regarded as a part of the conduit 3. It should be understood that the mixer bowl 7 is suitably open at some point such that air may enter the mixer bowl although air could in principle enter the system at some other point.

It is preferable to use a mixer bowl 7 with a rotatable element 8 for whipping the milk. However, the inventive arrangement/method for heating the milk could possibly be used in combination with some other means for transforming milk into foam.

In embodiments of the invention, the pump 4 may be controlled by a control device 10. According to one embodiment which is showed in FIG. 1, a first temperature sensor 9 may be located downstream of the continuous-flow heater 5 and arranged to detect the temperature of the milk in the conduit 3 downstream of the continuous flow heater 5. The first temperature sensor 9 is connected to the control device 10 and arranged to generate a signal representing the temperature of the milk in the conduit 3. It should be understood that the control device 10 is arranged to control the speed of the pump 4 at least partially on the basis of the temperature detected by the first temperature sensor 9.

Optionally, the control device 10 may also use other input. According to embodiments of the invention, a second temperature sensor 11 is located upstream of the continuous flow heater 5. The second temperature sensor 11 is also connected to the control device 10 and arranged to generate a signal representing the temperature of the milk in the conduit 3. The control device 10 may then be arranged to control the speed of the pump 4 on the basis of the temperatures detected by both the first and the second sensor 9, 11 respectively. For example, the control device 10 may be programmed to take into account the increase in temperature of the milk as the milk passes the continuous flow heater 5.

The system may also comprise a waste tray 17. If a waste tray 17 is used, a distributor valve 16 may be arranged in the conduit 3 in the path between the pump 4 and the mixer bowl 7. The distributor valve 16 allows liquid to be passed either to the mixer bowl 7 or to the waste tray 17. A source 12 of hot liquid may also be connected to the conduit 3 at a point upstream of the continuous flow heater 5. The source of hot liquid may in particular be a hot water tank. A tube or hose 21 connects the hot water tank 12 to the conduit 3. In the figure, it can be seen how a valve 14 such as a pinch valve may be arranged to connect the source 12 of hot liquid to the conduit 3. A one-way valve 18 may optionally be arranged to prevent milk to pass from the conduit 3 towards the source 12 of hot liquid.

The inventive method for producing foamed milk works in the following way. The pump 4 is operated to cause milk to flow from the milk container 1 through the conduit 3. The shut-off valve 20 (if such a valve is present) is then in an open position. The conduit 3 passes through the continuous-flow heater 5 and when the milk passes through the continuous-flow heater 5, the milk will be heated. Suitably, the milk is heated in the continuous-flow heater 5 to a temperature in the range of 58° C.-75° C. The milk is heated largely in order to make it easier to transform the liquid milk into foam. The inventors have found that the best temperature for foaming the milk is 60° C. but it is also desirable that the milk be hot when it reaches the beverage on which it should be a topping. The milk may also lose some of its heat during its path from the continuous-flow heater to the outlet 6. For this reason, the milk may be heated to a higher temperature than 60° C. However, the quality of the milk may deteriorate if the milk is heated above 75° C. For this reason, the milk should preferably not be heated above 75° C. In many cases, a temperature of about 70° C. may be suitable. The heated milk is conveyed by the pump 4 towards the outlet 6 where it can be added to a hot beverage. Before the milk reaches the outlet 6, it must pass through the mixer bowl 7 where it is whipped by the rotatable element 8 which is driven to rotate by the motor 19 or some other source of power for the rotatable element 8. Through the action of the rotatable element 8, the heated milk is transformed into foam which can then leave the system though the outlet 6.

The rotatable element 8 may have a diameter in the range of, for example, 3 cm-6 cm although other dimensions are also possible. The rotatable element 8 may rotate at a speed in the range of 9630 rpm-11770 rpm although other speeds may also be considered. The inventors have found that excellent results in terms of foam quality could be achieved when the rotating element 8 was rotating at a speed of about 10700 rpm (revolutions per minute). The milk that was whipped had a temperature in the previously mentioned range.

The quality of the foam is judged very much on the size of the bubbles. If the bubbles are too large, the foam will soon collapse. If they are too small, the milk will not obtain the desired "foamy" quality.

To ensure that the milk obtains the correct temperature, the heating can be controlled through the speed of the pump 4. If milk passes quickly through the continuous-flow heater, only a small amount of heat will be absorbed by the milk and the temperature will only increase marginally. Conversely, if the milk passes slowly through the heater 5, the temperature of the milk will become higher (assuming that the effect of the heater 5 remains constant). The speed of the pump 4 may be controlled by the control device 10 which is connected to the first temperature sensor 9. The control device 10 is programmed to maintain a set value for the temperature of the milk. Downstream of the continuous flow heater 5, the first sensor 9 will detect the temperature of the milk and generate a signal based on the detected temperature. The signal is sent to the control device 10 that controls the pump 4. If the signal from the first sensor 9 to the control device 10 indicates that the temperature of the milk is below the set value, the control device acts to decrease the speed of the pump 4. If the signal from the first sensor 9 indicates that the temperature of the milk is equal to the set value, the control device 10 will let the pump 4 continue to operate at the same speed. If the signal from the first sensor 9 indicates that the milk is too hot, the control device will send a command to the pump 4 to increase its speed such that the temperature of the milk becomes lower.

Optionally, the temperature of the milk may be detected also by a second temperature sensor 11 before the milk is passed through the continuous flow heater 5. The second sensor 11 is arranged to detect the temperature of the milk before the continuous flow heater 5 (i.e. upstream of the heater 5) and generate a signal based on the detected temperature. This signal from the second temperature sensor is sent to the control device 10. The control device 10 may then take into account not only the temperature of the milk after the continuous flow heater 5 but also the total temperature increase in the continuous flow heater 5. The speed of the pump 4 may then be controlled at least on the basis of both the temperature of the milk before the continuous flow heater 5 and the temperature of the milk after the continuous flow heater 5.

The measurement of the temperature of the milk may be performed by one or several sensors 9, 11 in direct contact with the milk or, alternatively, by at least one sensor that does not contact the milk, i.e. a contact-free temperature sensor. A contact-free sensor (i.e. a temperature sensor that does not come into physical contact with the milk) may be arranged on a part of the conduit (but without penetrating the conduit) or, alternatively, on the continuous flow heater 5.

The temperature control as described above can react very quickly and results in very effective temperature control. In realistic embodiments, the volume flow of the milk may be on the order of, for example, about 600 ml/minute and the quantity of milk used as topping for a cup of coffee or chocolate (or other hot beverage) may typically be in the range of 100 ml-200 ml. This means that the milk may need about 10 seconds -20 seconds to pass a given point in the system. This makes it possible to control the heating of the milk by altering the speed of the pump and practical tests have shown that the inventive method for heating the milk gives very reliable results. The method is also energy-effective and it permits the use of relatively simple heaters since it is not necessary that the heater itself be able to react quickly. In another realistic embodiment of the invention, the volume of flow of the milk may be on the order of 960 ml/minute or in the range of 910 ml/minute-1010 ml/minute which would give the milk about 6-13 seconds to pass a given point in the conduit assuming the quantity of milk is 100 ml -20 ml.

After a predetermined quantity of milk has been passed through the conduit 3 and out through the outlet 6, the valve 20 in the conduit 3 may be closed such that no more milk will flow from the milk container 1 and into the conduit 3. To clean the conduit, the valve 14 may be opened such that hot cleaning liquid (e.g. hot water) may flow from the source 12 of hot liquid and into the conduit 3. The pump 4 continues to operate and the cleaning liquid passes through the conduit 3 and passes the continuous flow heater 5 and the pump 4 until it reaches the distributor valve 16. The distributor valve 16 has now been switched and the hot cleaning liquid is passed not to the mixer bowl 7 but to a waste tray 17. The cleaning cycle may optionally be ended in the following way. The flow of hot liquid is interrupted. This can be achieved by closing the valve 14 that controls the flow through the tube or hose 21. Thereafter, the pump continues to operate such that air is pumped through the conduit 3. This removes remnants of cleaning liquid from the conduit 3. As a result, milk for the next topping will not be diluted by cleaning liquid.

During the cleaning, it may be so that only about half the hot cleaning liquid (normally hot water) reaches the mixer bowl 7 while the other half of the hot cleaning liquid goes to the waste tray 17. The proportions may vary but at least a part of the hot cleaning liquid would normally be sent to the mixer bowl 7. This means that the distributor valve 16 does not switch immediately when cleaning begins. In this way, also the mixer bowl gets cleaned. However, the amount of cleaning liquid that reaches the beverage with topping should be kept low. Therefore, only a part of the cleaning liquid is sent to the mixer bowl 7. The total amount of cleaning liquid may be about 20 ml of which 10 ml may be sent to the waste tray. The cleaning liquid may be hot water and the water temperature may be about 96° C. in realistic embodiments or in the range of 90° C.-98° C.

The distributor valve 16 and the waste tray 17 are advantageously located downstream of the pump 4 while the source 12 of hot liquid is advantageously located upstream of the continuous-flow heater. This means that almost the entire system/arrangement can be cleaned. Optionally, a distributor valve 16 and a waste tray 17 could be located between the rotatable element 8 and the outlet 6.

The inventive way of heating the milk may be used also for such systems and methods where the milk is not whipped by a rotating element but instead transformed into foam in some other way. For example, it could be used in a system where the milk is not whipped but mixed with air and passed through a throttle valve as disclosed in U.S. Pat. No. 7,527,818. If the milk is mixed with air, the air may be pressurized. Instead of the mixer bowl 7 with the rotatable element 8, any means for transforming the milk into foam could thus be used in combination with the inventive solution for heating the milk. However, the effective temperature control of the present invention in combination with the use of a rotating element such as an impeller makes it possible to produce excellent foam with good control.

The inventive way of cleaning the system cooperates effectively with the inventive solution for foaming the milk. However, it could conceivably be used also in combination with systems and methods where some other means for transforming the milk into foam is used.

The use of a rotating element that whips the heated milk into foam is simple and very reliable and does not require any complicated extra connections for steam or pressurized air. The use of a rotating element such as an impeller also makes the process easy to control, the foaming operation is determined by variables that are known and can be easily adjusted.

Figure 1:
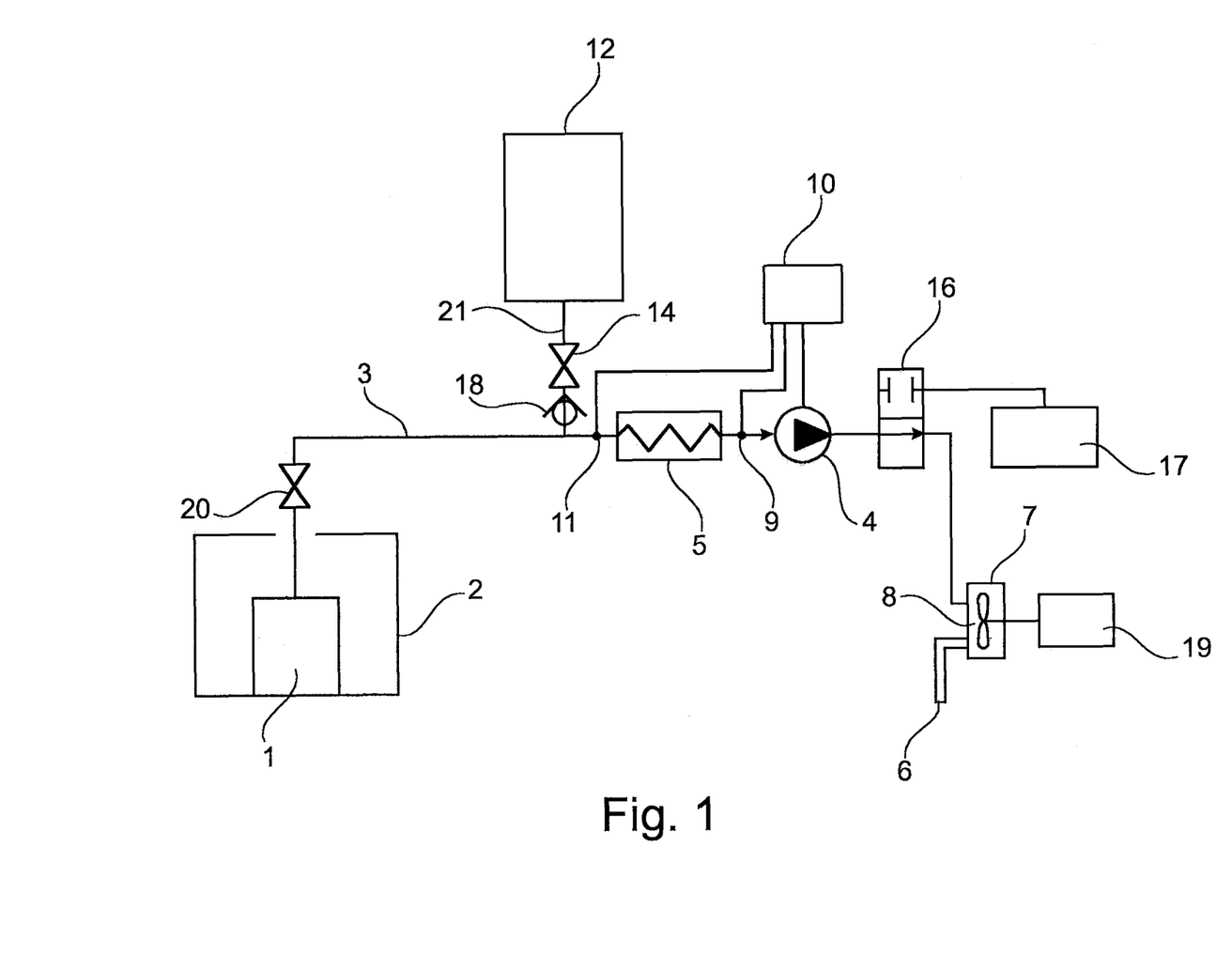
FIG. 1 is a schematic illustration of a first embodiment of the invention.

In the embodiment of FIG. 1, the pump 4 is located downstream of the continuous-flow heater which may be benefit the operating conditions in some cases.

Figure 2:
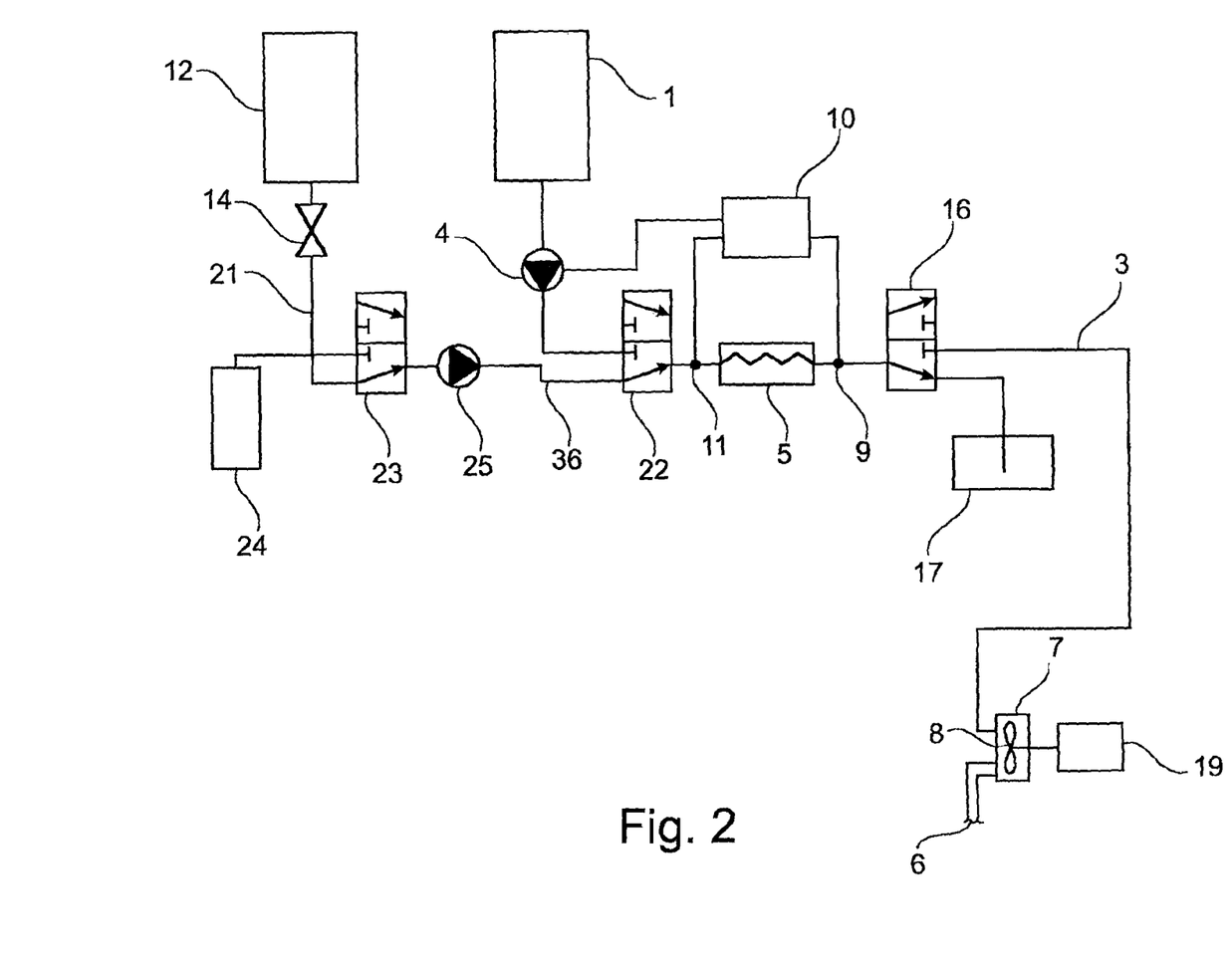
FIG. 2 is a schematic representation of a second embodiment of the invention.

A second embodiment of the invention will now be described with reference to FIG. 2. The arrangement shown in FIG. 2 is substantially similar to the arrangement of FIG. 1 but with the following differences. In the arrangement of FIG. 2, the pump 4 is placed upstream of the continuous-flow heater 5, i.e. closer to the container 1 for milk. In the arrangement of FIG. 2, the milk conduit 3 is also connected to the container 1 for milk via a distributor valve 22 located between the pump 4 and the continuous-flow heater 5. There is thus a first distributor valve 16 downstream of the continuous-flew heater and a second distributor valve 22 upstream of the continuous-flow heater 5. Through the second distributor valve 22, the milk conduit 3 can also be connected to a source of a cleaning agent for the milk conduit 3. The cleaning agent is preferably a liquid cleaning agent although a gaseous cleaning agent is conceivable. The cleaning agent can be brought to the second distributor valve 22 via a conduit 36 for the cleaning agent. In the embodiment of FIG. 2, there is a pump 25 arranged to act on a liquid in the conduit 36 for a cleaning agent. The embodiment of FIG. 2 thus has a first pump 4 and a second pump 25. The second pump 25 may be a peristaltic pump and the conduit 36 may comprise a flexible tube part that passes through the second pump 25 such that the pump 25 which is a peristaltic pump may act on a liquid in the conduit 36. The source of a cleaning agent may be a container 12 which contains hot liquid such as hot water. The container 12 may be provided with heating means (not shown) for heating a liquid in the container 12, for example water. Alternatively, water or some other liquid may be heated at another place and subsequently brought to the container 12. The source of a cleaning agent may alternatively be a container 24 for a liquid chemical cleaning agent. In the embodiment of FIG. 2, the hot liquid container 12 and the container 24 for a liquid chemical cleaning agent are connected to the conduit 36 for a cleaning liquid via a third distributor valve 23. By means of the third distributor valve 23, a choice of cleaning agent can be made such that either a hot liquid from the container 12 or a liquid chemical cleaning agent can be sent into the conduit 36 and further into the milk conduit 3.

Figure 3:
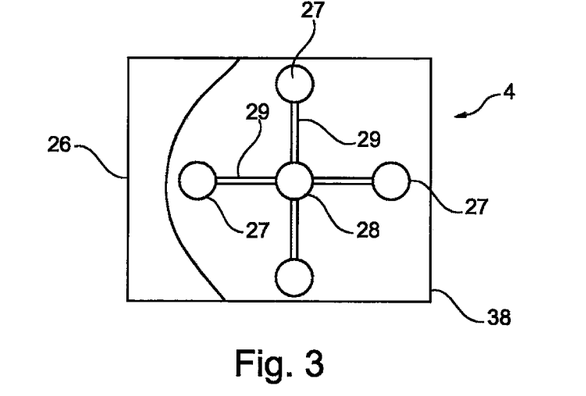
FIG. 3 is a schematic representation of a pump which is suitable for use in the invention.
Figure 4:
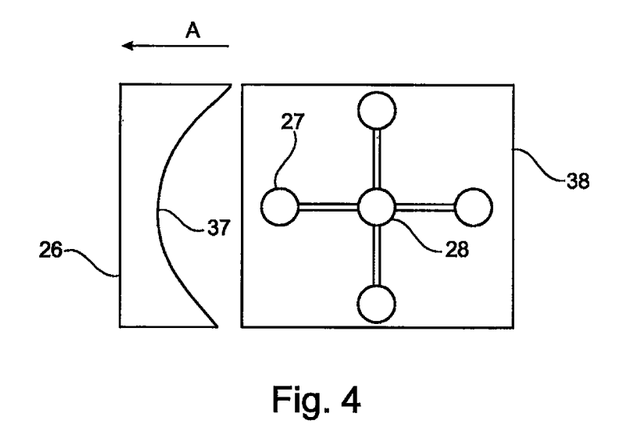
FIGS. 4-6 show how a flexible tube is inserted into the pump shown in FIG. 4.
Figure 5:
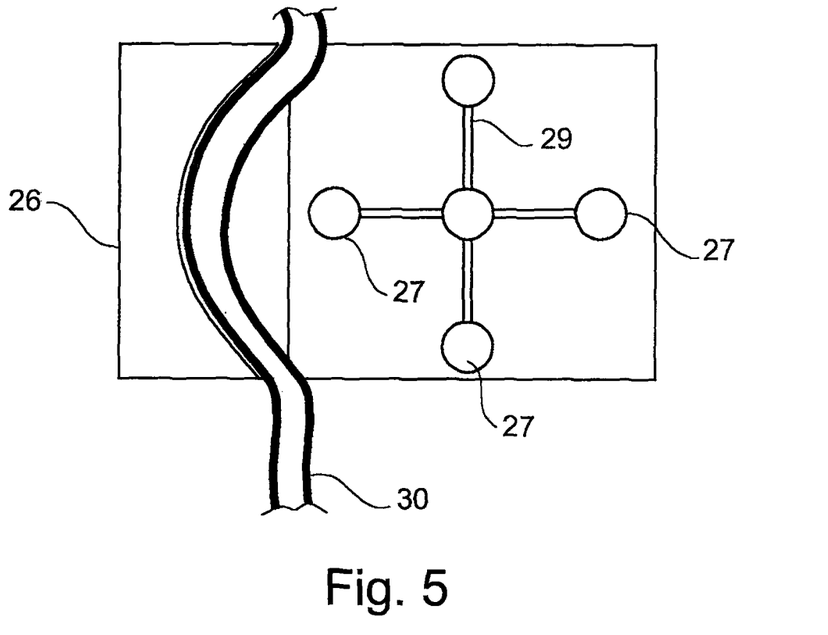
Figure 6:
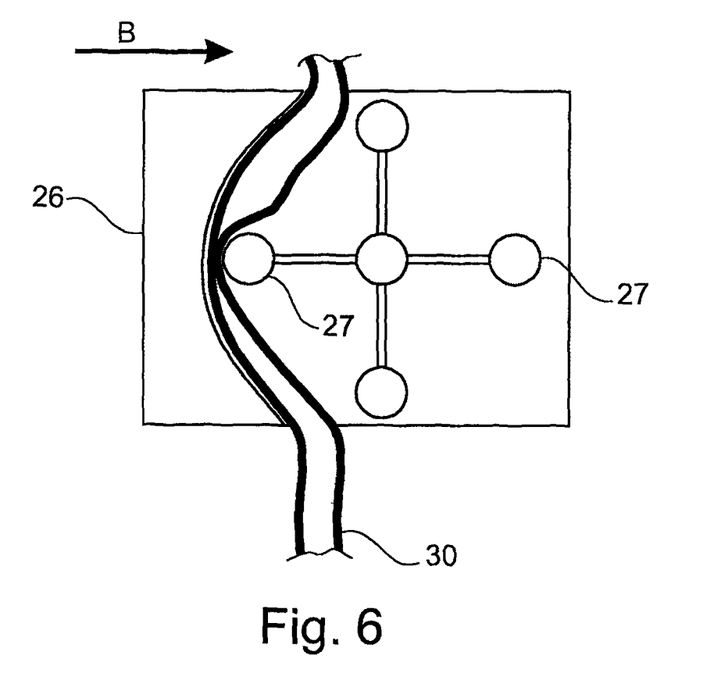
Figure 8:
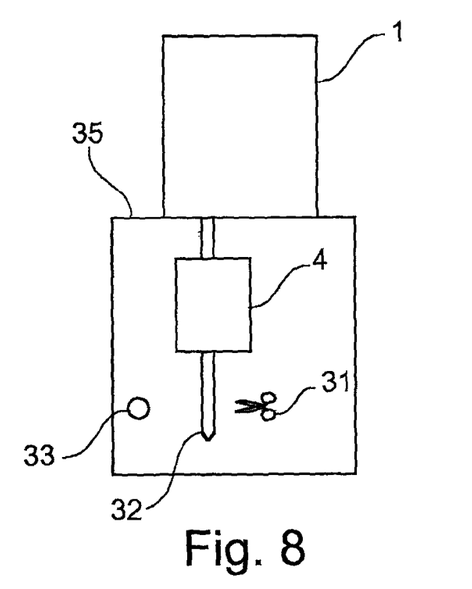
FIGS. 8-10 show, schematically, how a milk container may be connected to the inventive arrangement.
Figure 9:
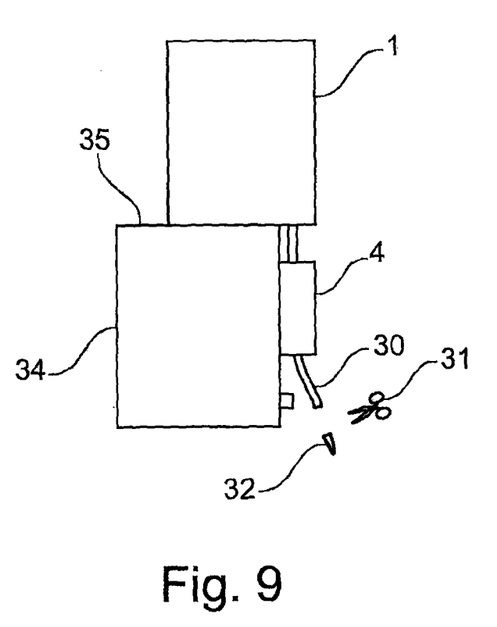
Figure 10:
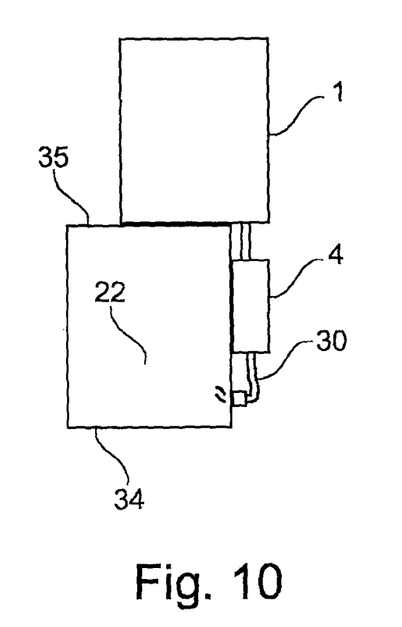

When a peristaltic pump is placed upstream of the continuous-flow heater 5, i.e. in the position of the pump 4 in FIG. 2, this entails an advantage as will be explained in the following with reference to FIGS. 3-9. When a milk container 1 has become empty, it must be replaced by a new milk container. The milk container 1 would normally be a bag-in-box container where the milk is contained in a flexible bag inside a paperboard box (although other containers are also possible). The flexible bag which is normally made of a plastic material may be provided with a short outlet tube 30 which is initially sealed at its end 32, see FIG. 7. The outlet tube 30 is filled with milk since it is in direct communication with the flexible bag but since the outlet tube 30 is sealed at its end, milk cannot escape from the outlet tube. The outlet tube is suitably made of a flexible material; preferably the flexible bag and the outlet tube 30 may be made in the same plastic material. When the empty milk container has been removed, a new milk container 1 is introduced. The new milk container 1 may be placed on a support surface 35 of a structure 34 that may form a part of the inventive system as shown in FIGS. 8-10. The first pump 4 may suitably be arranged on the same structure 34. When the milk container 1 has been placed on the support surface 35, the outlet tube 30 will be hanging from the lower side of the milk container 1. When the milk container 1 has been correctly placed, the outlet tube 30 will reach the first pump 4 and can be connected to the first pump 4. With reference to FIG. 3 and to FIG. 4, the first pump 4 is suitably a peristaltic pump that comprises a first part 26 with a curved surface 37 that faces a second part 38 of the pump 4. The second part 38 of the peristaltic pump has a hub 28 that carries arms 29. At the end of each arm 29, a roll 27 is arranged. The rolls 27 are intended to act on a flexible tube. The first part 26 of the pump 4 can be moved away from the second part 38 in the direction of arrow A (see FIG. 4) such that a gap is created between the first and second parts respectively. The outlet tube 30 can now be introduced into the gap as shown in FIG. 5. At this point, the rolls 27 of the pump 4 do not act on the outlet tube but no milk can escape from the outlet tube since the outlet tube 30 is sealed at its end 31. The first part 26 is then moved in the direction of arrow B (see FIG. 6) such that it returns to its original position. In this position, at least one of the rolls 27 presses the outlet tube 30 together tightly such that no liquid can pass the point where the outlet tube is compressed. The outlet tube 30 is now properly positioned in the pump 4 but is not connected to the milk conduit 3 and milk cannot leave the container 1 through the outlet tube 30. This situation is represented in FIG. 8. In FIG. 8, it can be seen how the milk container 1 is standing on the support surface 35 and a part of the outlet tube 30 is hanging from the pump 4. To connect the outlet tube to the milk conduit 4, the sealed end 32 of the outlet tube is cut off, for example by means of a cutting tool 31. When the sealed end 32 has been cut off, the outlet tube 30 from the milk container 1 can be connected to the milk conduit 3. This can be done by connecting the outlet tube 30 to a coupling 33 which in turn is connected to the second distributor valve 22. When the end 32 of the outlet tube is cut off, the outlet tube 30 is opened and the milk downstream of the point where the outlet tube 30 is squeezed together by the pump 4 will pour out. When the outlet tube has been connected to the coupling 33, there will thus be a small amount of air trapped in a part of the tube. To expel air from the system, a quantity of milk may be pumped through the milk conduit by means of the pump 4. By expelling air from the system, the risk that milk in the container 1 will be exposed to air is reduced. Air is preferably expelled from the system within 5 minutes after the outlet tube 30 has been connected to the milk conduit 3. With the outlet tube 30 connected to the milk conduit 3, the outlet tube 30 may of course be regarded as a part of the milk conduit 3 although it may be expedient to discuss the outlet tube 30 as a component that is separate from the milk conduit. To further reduce the risk that air enters the milk container, a one-way valve may be placed downstream of the pump 4, for example in the outlet tube 30 or in connection with the coupling 33.

A sequence of operation for the embodiment of FIG. 2 will now be explained. A user of the inventive system requests that a quantity of foamed milk be prepared. This would normally be done together with a request for a hot beverage such as coffee or chocolate. The request can be made for example by pressing a button. When this is done, the second distributor valve 22 will be switched to a position for feeding cleaning fluid into the milk conduit 3 (if the second distributor valve 22 is not already in this position). The third distributor valve will be switched to a position for allowing liquid from the source 12 of hot liquid (if the third distributor valve is not already in this position). The valve 14 to the container for hot liquid is opened and the second pump 25 is activated to pump hot liquid through the conduit 36 and the milk conduit 3. The hot liquid is suitably water at a temperature of 90° C.-99° C., preferably 94° C.-98° C. For example, the hot liquid may have a temperature of 97° C. In many realistic embodiments, about 5 ml-20 ml of hot water may be used, suitably 8 ml-12 ml, for example 10 ml. The hot liquid is allowed to pass through the conduits during 1-2 seconds and may then be sent to the waste tray 17. The second pump 25 may then be halted. The milk conduit 3 has now been flushed along the major part of its path. The valve 14 is closed and the second distributor valve 22 is switched to a position where it allows milk from the milk container 1 to enter the milk conduit. Optionally, the valve 14 may remain open while only the second distributor valve 22 is switched. The first pump 4 is activated and milk is pumped from the milk container 1, through the continuous-flow heater 5 and to the mixer bowl 7 where it is whipped and thereby transformed to foam. The foamed milk is then dispensed out through the outlet 6. The pump 4 is stopped and the second distributor valve 22 is switched to a position where milk from the container 1 can no longer enter the milk conduit 3 but where a liquid cleaning agent from the conduit 36 can enter the milk conduit 3. The second pump 25 is activated again and hot cleaning liquid is passed into the milk conduit 3 to flush away remnants of the milk. This time, a larger quantity of hot liquid is used, suitably about 16 ml-30 ml in many realistic embodiments. The quantity used is suitably twice as large or about twice as large as the quantity used before milk was sent through the conduits. Of the hot liquid that is now sent through the conduits, about half is sent to the mixer bowl 7 to clean the mixer bowl. For example, is a total of 20 ml of hot water is used, 10 ml may be sent to the mixer bowl while 10 ml will be sent to the waste tray 17 after activation of the first distributor valve 16. A small quantity of hot water will therefore reach the outlet (6) and may therefore also reach the cup of the user that has requested foamed milk for his beverage (e.g. coffee).

The above described sequence that includes flushing with hot liquid (normally hot water) in direct connection with the preparation of a quantity of foamed milk will significantly contribute to hygiene and reduce the amount of harmful bacteria.

While flushing with hot water in connection with each brewing sequence may significantly improve hygiene, it may be beneficial to run a special additional cleaning sequence with a chemical cleaning agent now and then, preferably during the night when the system is normally not used. This extra cleaning sequence may suitably be performed 3-7 times per week and may be performed at regular intervals. The extra cleaning sequence may be as follows. First, the second distributor valve 22 is switched to a position where a liquid cleaning agent can be sent from the conduit 36 into the milk conduit 3 (unless the second distributor valve is already in such a position) and the third distributor valve 23 is switched to a position where hot liquid from the container 12 can be sent into the conduit 36 (unless the third distributor valve is already in this position). The second pump 25 is started and a quantity of hot liquid is sent from the container 12 into the milk conduit 3. The hot liquid flushes the milk conduit 3 for at least 1 second, preferably all the way to the mixer bowl 7 but optionally only to the waste tray 17. The flow of hot water is interrupted, for example by closing of the valve 14 or by interruption of the pump 25. The third distributor valve 23 is switched to a position where a chemical cleaning agent can enter the conduit 36. The second pump 25 is activated again and a liquid chemical cleaning agent is pumped into the milk conduit 3, preferably all the way to the mixer bowl 7 but optionally only to the waste tray 17. The liquid chemical cleaning agent is allowed to rest in the conduits, preferably during at least 60 seconds and preferably at least 90 seconds. Conceivably, it could rest in the system for 2-10 minutes or even more. The liquid chemical cleaning agent is then pumped out of the system by means of the second pump 25. The container 24 for the liquid chemical cleaning agent will be disconnected when the chemical cleaning agent is pumped out of the system. Optionally, the conduits 3, 36 are once again flushed with hot liquid from the container 12. The conduits are then allowed to air dry for some minutes before the system is ready to be used again. For air drying, air may be pumped through the milk conduit 3. Preferably, the milk conduit 3 is allowed to air dry for 4-10 minutes, for example 5 minutes, before milk is once again allowed to pass through the milk conduit 3.

The extra cleaning sequence with a liquid chemical cleaning agent may be necessary in some cases to remove precipitations of albumin and/or calcium from the walls of the conduit. The milk may contain albumin and/or calcium has precipitated on the walls of the conduits.

The configuration of FIG. 2 allows a more effective cleaning of the milk conduit 3. Moreover, placing the first pump 4 upstream of the continuous-flow heater makes it easier to change the milk container 1. In all other respects, the embodiment of FIG. 2 functions in the same way as the embodiment of FIG. 1 as already described.

Figure 11A:
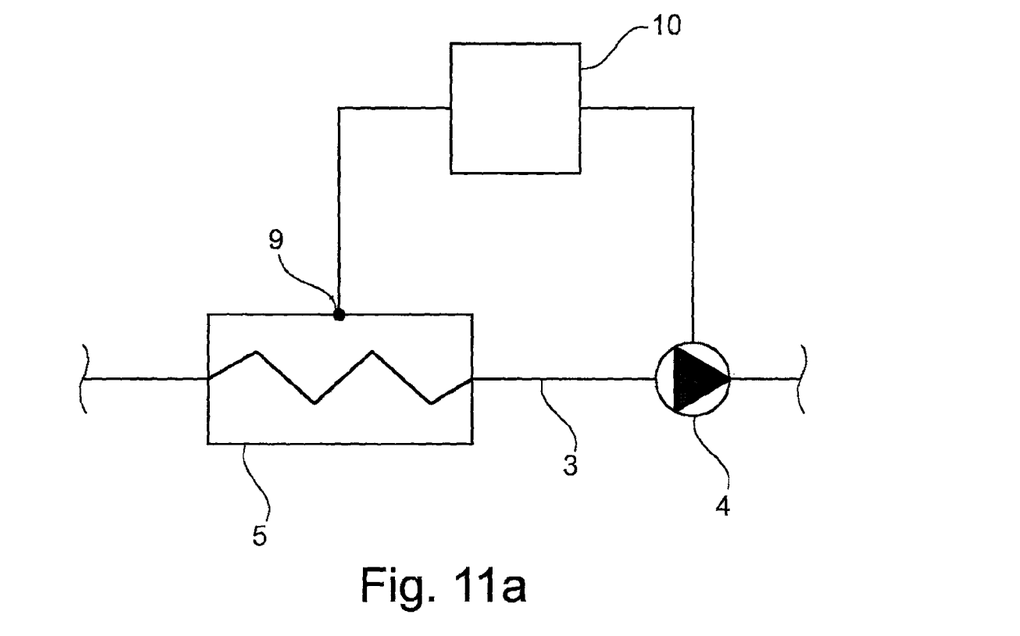
FIGS. 11a and 11b show, schematically, two different embodiments of the invention.
Figure 11B:
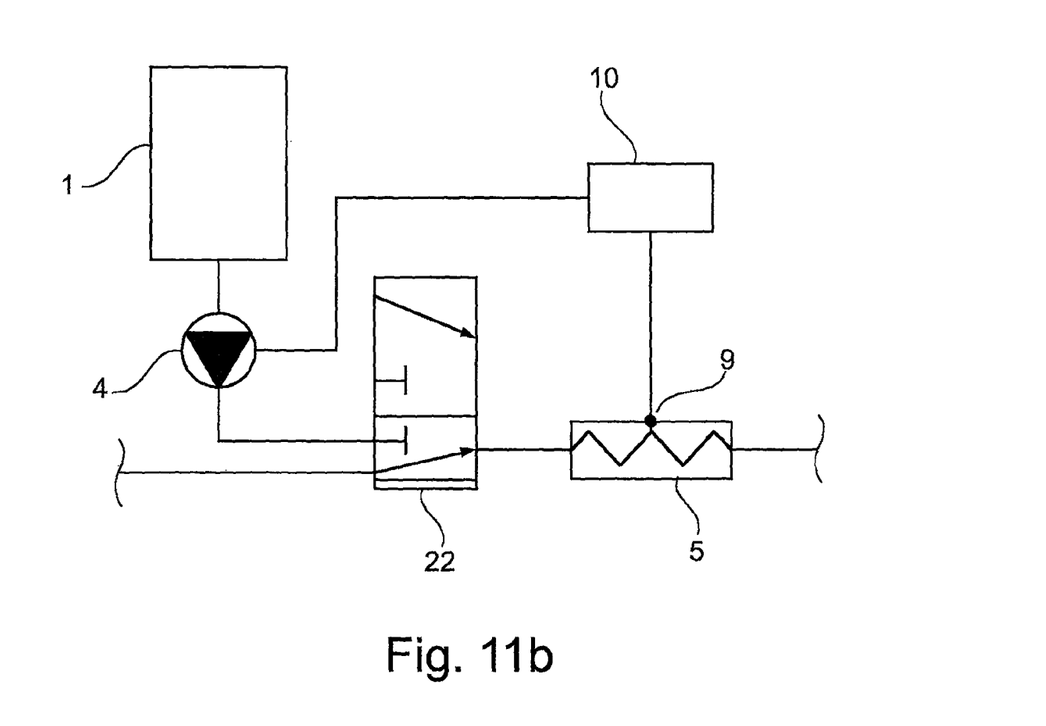

It has previously been described how the speed of the pump 4 which is arranged to convey mil through the milk conduit 3 may be controlled based on a measurement of temperature downstream of the continuous flow heater and optionally also based on a measurement of temperature upstream of the continuous flow heater 5. An alternative way of controlling the speed of the pump 4 will now be explained with reference to FIG. 11a and FIG. 11b. In the two alternative embodiments that are schematically illustrated in FIGS. 11a and 11b, the speed of the pump may 4 be controlled on the basis of a measurement of the temperature of a part of the continuous flow heater 5 instead of a measurement of the temperature of the milk downstream of or upstream of the continuous flow heater 5. FIG. 11a shows an embodiment which is substantially similar to the embodiment of FIG. 1, except that the temperature sensor 9 is arranged on or adjacent the continuous flow heater 5. The temperature sensor 9 is thus arranged to measure the temperature of the continuous flow heater 5 or a part of the continuous flow heater 5. Through practical trials, a correlation/relationship between the temperature of the continuous flow heater 5 and the temperature of the milk that leaves the continuous flow heater 5 can be established. When this correlation or relationship has been established, knowledge of the temperature of the continuous flow heater 5 can be used to determine the temperature of the milk that leaves the continuous flow heater 5. Of course, the temperature of the milk that leaves the continuous flow heater also depends on the speed with which the milk passes through the continuous flow heater 5. The influence of the speed of flow can also be tested experimentally. Based on practical trials, a suitable speed for the pump 4 can be chosen when the temperature of a part of the continuous flow heater 5 is known. The speed of the pump 4 is suitably controlled by the control device 10 according to an algorithm that may have been established based on practical trials as explained above.

When the temperature of the continuous flow heater 5 is measured instead of the temperature of the milk, the sensor or sensors 9, 11 need not contact the milk itself. The measurement of temperature becomes a contact-fee measurement. This decreases the risk that the milk may become exposed to bacteria and thereby improves hygiene. In other respects, the embodiments of FIG. 11a and FIG. 11b offer the same advantages as the solution where the speed of the pump 4 is controlled based on the temperature of the milk downstream of the continuous flow heater.

The embodiment of FIG. 11b substantially corresponds to the embodiment of FIG. 2 except that the temperature sensor 9 is arranged to measure the temperature on a part of the continuous flow heater 5. This works in the same way as described above with reference to FIG. 11a.

The method of controlling the heating of the milk may thus be described generally as a method in which the temperature of either the milk or a part of the system for producing foamed milk is measured and the speed of the pump 4 arranged to convey milk through the milk conduit 3 is controlled based on the measured temperature. Specifically, the part of the system where temperature is measured may be a part of the conduit 3 or the continuous flow heater 5. Embodiments are conceivable where the continuous flow heater 5 has been designed such that it is a part of the milk conduit 3 and directly contacts the milk.

The general principle of controlling the speed of the pump based on a temperature measurement may be used independently of exactly how the milk is transformed into foam. However, it should preferably be combined with the use of a rotating element that whips the milk into foam since this produces the best end result.

While the invention has been described above in terms of a method and a system, it should be understood that these categories only reflect different aspects of one and the same invention. The method may thus include such steps that inevitably follow from use of the described system, regardless of whether such steps have been explicitly mentioned or not. In the same way, the system is a physical form of the same invention as the method.

The invention may also be defined in terms of a computer program for controlling the above described method. For example, the invention may be defined in terms of a computer program for the control device 10. Such a program may comprise instruction for the control device to increase or decrease the speed of the pump in response to a signal from a temperature sensor 9, 11 that indicates that the temperature of the milk deviates from a set value. The program may take the physical form of a computer program product comprising a computer usable storage medium on which the computer program is written.

The control device 10 may include software to control also the cleaning process. Therefore, the control device 10 may also be connected to the valve 20 in the conduit 3, to the valve 14 in the tube 21 that connects the source 12 of hot liquid to the conduit 3 and to the distributor valve 16. Alternatively, a separate control device may be used to control the valves 14, 20 and the distributor valve 16. The invention may then also take the physical form of a computer program product comprising a computer usable storage medium on which instructions for the above described cleaning processes are written as a computer program (or several different computer programs for different cleaning processes).

The control device 10 may also be arranged to control the distributor valves 22, 23 shown in FIG. 2 and may include software for that purpose.

The motor 19 for the impeller 8 may be controlled by the same control device 10 as the pump 4. Alternatively, it may be controlled in some other way. Preferably, all valves, the pump and the motor 19 may be controlled by the same control device 10. Such an arrangement allows the entire foaming process and the cleaning process to be effectively controlled and coordinated with each other.

With regard to the embodiment of FIG. 1, the shut-off valve 20 could also be a pinch valve. If pinch valves are used, they can operate of parts of the conduit 3 that are made of as flexible and/or elastic tube.

In FIG. 1 and FIG. 2, the control device 10 is showed as an element that is separate from the pump 4. However, it should be understood that the control device 10 may be integrated with the pump 4 such that the control device 10 is located on or in the pump 4.

With regard to the embodiment of FIG. 2, it should be understood that the control device 10 may be connected also to the second pump 25, to the valve 14 and the distributor valves 22, 23 and 16 and arranged to control the operation of these components. The invention can also be understood in terms of a computer usable storage medium on which instructions for the cleaning process according to the embodiment of FIG. 2 are written as a computer program.

Although a continuous-flow heater is preferred, the inventive solution of using a rotatable element for transferring the milk into foam could possibly be combined with other heaters.

The use of peristaltic pumps entails the advantage that the pumps 4, 25 may also act as pinch valves when the pumps are not active to convey fluid through the conduits. This means that the number of components can be reduced. However, it should be understood that other pumps than peristaltic pumps could conceivably be used and it is believed by the applicant that any known type of pump may be used.

The conduits used may be, for example, plastic tubes of a thermoplastic elastomer (TPE). In some realistic embodiments, the TPE tubes may have an outer diameter of about 3/8 inches (about 9.5 mm) and an inner diameter of about 1/4 inch (about 6.4 mm).

It should be understood that the inventive method may be used in a machine for hot beverages such as coffee or chocolate, for example in a vending machine. It should also be understood that the inventive system may form a part of a machine for brewing hot beverages such as coffee of chocolate, for example a coffee vending machine.

The invention claimed is:

1. A method for producing foamed milk, the method comprising:
   providing a milk container having an outlet tube comprising a flexible material constructed for use in a peristaltic pump, wherein the outlet tube is initially sealed at its end;
   placing a portion of the outlet tube in a peristaltic pump while the outlet tube is still sealed at its end such that the pump squeezes the outlet tube together and blocks the passage of fluid through the outlet tube when the pump is not activated;
   opening the outlet tube downstream of the peristaltic pump and connecting the outlet tube to a milk conduit such that milk may pass from the milk container and into the milk conduit when;
   passing milk from the milk container through the milk conduit by means of the peristaltic pump;
   heating the milk by passing the milk through or past a continuous-flow heater arranged to heat milk in the milk conduit;
   conveying the heated milk through the milk conduit to a mixer bowl located upstream of an outlet and in which mixer bowl a rotating element is arranged to be able to whip heated milk into foam, the mixing bowl having an inlet for allowing air to enter the mixing bowl;
   whipping the heated milk by means of the rotating element such that the heated milk is transformed to foamed milk without the use of steam or compressed air; and
   discharging the foamed milk through an outlet.

2. The method according to claim 1, wherein the milk is heated in the continuous-flow heater to a temperature in the range of 58° C.-75° C.

3. The method according to claim 1, wherein the rotating element operates at a speed of 9630 rpm-11770 rpm.

4. The method according to claim 1, wherein the temperature of either the milk or a part of the system for producing foamed milk is measured and the speed of the pump is controlled based on the measured temperature.

5. The method according to claim 1, wherein, after the milk has been passed through the continuous-flow heater, the temperature of the milk is detected by a first temperature sensor and a signal from the first temperature sensor is generated which signal is based on the detected temperature and used to control the speed of the pump in order to reach or maintain a set value for the temperature of the milk.

6. The method according to claim 5, wherein the temperature of the milk is detected also by a second temperature sensor before the milk is passed through the continuous flow heater and in that the speed of the pump is controlled at least on the basis of both the temperature of the milk before the continuous flow heater and the temperature of the milk after the continuous flow heater.

7. The method according to claim 1, wherein, after a predetermined quantity of milk has been passed through the milk conduit and out through the outlet, a hot cleaning liquid such as water is caused to flow through the conduit such that the milk conduit is cleaned, wherein the method preferably also comprises interrupting the flow of hot cleaning liquid and operate the pump to pump air through the milk conduit such that remnants of liquid are removed from the milk conduit.

8. The method according to claim 1, wherein the method additionally comprises: passing a first quantity of hot cleaning liquid through the milk conduit before milk is pumped through the milk conduit, the hot cleaning liquid having a temperature in the range of 90° C.-99° C.; pumping milk through the milk conduit and transforming the milk into foamed milk; and
   passing a second quantity of hot cleaning liquid at a temperature in the range of 90° C.-99° C. through the milk conduit and allowing at least a part of the second quantity of hot cleaning liquid to reach the outlet.

9. The method according to claim 1, wherein the method additionally comprises: passing a first quantity of hot cleaning liquid through the milk conduit before milk is pumped through the milk conduit, the hot cleaning liquid having a temperature in the range of 94° C.-98° C.; pumping milk through the milk conduit and transforming the milk into foamed milk; and passing a second quantity of hot cleaning liquid at a temperature in the range of 90° C.-99° C. through the milk conduit and allowing at least a part of the second quantity of hot cleaning liquid to reach the outlet.

10. The method according to claim 1, wherein the method additionally comprises a chemical cleaning sequence that is performed 2-7 times per week, the chemical cleaning sequence comprising: flushing the milk conduit with hot cleaning liquid from the source of hot cleaning liquid; passing a liquid chemical cleaning agent into the milk conduit such that at least a part of the milk conduit is filled by the liquid chemical cleaning agent; letting the liquid chemical cleaning agent remain in the milk conduit for at least 60 seconds; pumping the chemical cleaning agent out of the milk conduit; and letting the milk conduit air dry for at least 4 minutes before milk is passed through the milk conduit.

11. A foamed milk system for producing foamed milk, the system comprising:
   a milk container having an outlet tube comprising a flexible material constructed for use with a peristaltic pump, wherein the outlet tube is initially sealed at its end;
   a milk conduit which is connected to or connectable to the outlet tube of the milk container;
   a continuous flow heater arranged to be capable of heating milk in the milk conduit;
   a peristaltic pump arranged to convey a liquid from the outlet tube and through the milk conduit;

an outlet at an end of the conduit through which outlet foamed milk can leave the conduit; and a mixer bowl located upstream of the outlet and in which mixer bowl a rotatable element is arranged to be able to whip heated milk into foam without the use of steam or compressed air.

12. The system according to claim 11, wherein the system comprises a first temperature sensor arranged to detect the temperature of the milk in the milk conduit downstream of the continuous flow heater and a control device arranged to control the speed of the pump and wherein the first temperature sensor is connected to the control device and arranged to generate a signal representing the temperature of the milk in the milk conduit and wherein the control device is arranged to control the speed of the pump at least partially on the basis of the temperature detected by the first temperature sensor.

13. The system according to claim 12, wherein the system comprises a second temperature sensor arranged to detect the temperature of the milk in the milk conduit upstream of the continuous flow heater and which second temperature sensor is connected to the control device and arranged to generate a signal representing the temperature of the milk in the milk conduit, wherein the control device is arranged to control the speed of the pump at least partially on the basis of the temperatures detected by both the first and the second sensor respectively.

14. The system according to claim 11, wherein the system comprises a waste tray and in that a distributor valve is arranged in the conduit in the path between the pump and the mixer bowl, the distributor valve allowing liquid to be passed either to the mixer bowl or to the waste tray, and in that preferably a source of hot liquid is connected to the milk conduit, preferably at a point upstream of the continuous flow heater.

15. The system according to claim 11, wherein the system additionally comprises a distributor valve which is connected or connectable to both the milk container and at least one source of a cleaning agent such that either milk or a cleaning agent can be passed through the milk conduit depending on the position of the distributor valve and in that a conduit for a cleaning agent connects the at least one source of a cleaning agent to the distributor valve that is connected to or connectable to the milk container.

16. The system according to claim 11, wherein the system comprises a source of a hot cleaning liquid and a source of a chemical cleaning agent and in that a distributor valve is connected to the conduit for a cleaning agent and also connected to both the source of a hot cleaning liquid and to the source of a chemical cleaning agent such that either a hot cleaning liquid or a chemical cleaning agent can be sent through the conduit for a cleaning agent and further to the milk conduit.

* * * * *